US011907324B2

(12) United States Patent
Bitdinger et al.

(10) Patent No.: US 11,907,324 B2
(45) Date of Patent: Feb. 20, 2024

(54) GUIDED FORM GENERATION IN A DOCUMENT MANAGEMENT SYSTEM

(71) Applicant: DocuSign, Inc., San Francisco, CA (US)

(72) Inventors: Gustavo Both Bitdinger, San Diego, CA (US); Mangesh Prabhakar Bhandarkar, Los Altos, CA (US); Nipun Dureja, Seattle, WA (US); Vasudevan Sampath, Southlake, TX (US); Robert Sherwin, Kirkland, WA (US); Duane Robert Wald, Surprise, AZ (US); Mark Spencer Seabourne, Bend, OR (US); Claire Marie Small, Ypsilanti, MI (US); David Minoru Hirotsu, Torrance, CA (US); Dia A. Abulzahab, Willowbrook, IL (US); Li Xu, Kirkland, WA (US); Brent Weston Robinett, Seattle, WA (US); Jerome Levadoux, San Mateo, CA (US); Ellis David Berner, Mercer Island, WA (US); Jun Gao, Foster City, CA (US); Andrew James Ashlock, San Francisco, CA (US); Jacob Scott Mitchell, Richmond, VA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

(21) Appl. No.: 17/733,849

(22) Filed: Apr. 29, 2022

(65) Prior Publication Data
US 2023/0350971 A1 Nov. 2, 2023

(51) Int. Cl.
*G06F 16/958* (2019.01)
*G06F 16/93* (2019.01)
(Continued)

(52) U.S. Cl.
CPC ............ *G06F 16/972* (2019.01); *G06F 16/93* (2019.01); *G06F 40/174* (2020.01);
(Continued)

(58) Field of Classification Search
CPC ...... G06F 16/972; G06F 16/93; G06F 40/191; G06F 40/174; G06N 20/00; G06V 30/413
See application file for complete search history.

(56) References Cited

U.S. PATENT DOCUMENTS

| 7,529,761 B2 * | 5/2009 | Wen ........................ G06F 40/169 |
| 10,147,020 B1 * | 12/2018 | Hodson .................... G06F 18/29 |

(Continued)

FOREIGN PATENT DOCUMENTS

WO    WO-2020243619 A1 *  12/2020  ......... G06K 9/00483

OTHER PUBLICATIONS

International Search Report and Written Opinion of International Application No. PCT/US2023/020438 dated Aug. 30, 2023, 14 pp.

*Primary Examiner* — Shahid K Khan
(74) *Attorney, Agent, or Firm* — Shumaker & Sieffert, P.A.

(57) ABSTRACT

Systems and methods are disclosed herein for generating and modifying a workflow comprising a series of webpages based on an online document. A document management system accesses an online document selected by a user and classifies each field of the online document into one of a set of categories. For each category, the system generates a form webpage comprising questions corresponding to each field classified as the category and combines the generated webpages to create a workflow. The system may modify the workflow by generating and adding one or more additional form webpages based on one or more answers provided by an entity completing the webform page. In response to the entity completing the modified generated workflow, the (Continued)

system generates a completed document based on the online document and the answers provided by the entity.

20 Claims, 14 Drawing Sheets

(51) Int. Cl.
    *G06N 20/00*             (2019.01)
    *G06V 30/413*         (2022.01)
    *G06F 40/191*         (2020.01)
    *G06F 40/174*         (2020.01)

(52) U.S. Cl.
    CPC ........... *G06F 40/191* (2020.01); *G06N 20/00* (2019.01); *G06V 30/413* (2022.01)

(56) References Cited

U.S. PATENT DOCUMENTS

| | | | |
|---|---|---|---|
| 10,546,054 B1* | 1/2020 | Foroughi | G06N 20/00 |
| 10,614,099 B2* | 4/2020 | Eigner | G06F 16/9535 |
| 11,450,412 B1* | 9/2022 | Mohiuddin | G16H 10/60 |
| 11,594,311 B1* | 2/2023 | Bradley | G06N 20/00 |
| 2004/0260551 A1* | 12/2004 | Atkin | G10L 13/08 |
| | | | 704/E13.011 |
| 2006/0031764 A1* | 2/2006 | Keyser | G06F 40/114 |
| | | | 715/251 |
| 2008/0147790 A1* | 6/2008 | Malaney | G06Q 10/00 |
| | | | 709/203 |
| 2011/0119209 A1* | 5/2011 | Kirshenbaum | G06N 5/02 |
| | | | 706/12 |
| 2013/0198628 A1* | 8/2013 | Ethier | G06F 9/453 |
| | | | 715/709 |
| 2013/0218872 A1* | 8/2013 | Jehuda | G06F 16/335 |
| | | | 707/722 |
| 2015/0193735 A1* | 7/2015 | Lavrov | G06Q 10/10 |
| | | | 705/342 |
| 2015/0220233 A1* | 8/2015 | Kok | G06F 9/4411 |
| | | | 715/222 |
| 2016/0019197 A1* | 1/2016 | Iasi | G06F 40/174 |
| | | | 715/224 |
| 2016/0104077 A1* | 4/2016 | Jackson, Jr. | G06N 20/00 |
| | | | 706/12 |
| 2017/0075873 A1* | 3/2017 | Shetty | G06F 16/9535 |
| 2017/0075974 A1* | 3/2017 | Shetty | G06F 40/174 |
| 2017/0235735 A1* | 8/2017 | Ignatyev | G06Q 10/00 |
| | | | 706/12 |
| 2018/0012268 A1* | 1/2018 | Simantov | G06N 20/00 |
| 2018/0018741 A1* | 1/2018 | Mukherjee | G06N 3/126 |
| 2018/0144042 A1* | 5/2018 | Sheng | G06Q 10/10 |
| 2018/0373711 A1* | 12/2018 | Ghatage | G06V 30/412 |
| 2019/0243889 A1* | 8/2019 | Carter | G06F 3/04883 |
| 2020/0110792 A1 | 4/2020 | Tsabba | |
| 2021/0224471 A1* | 7/2021 | Menichetti | G06F 40/274 |
| 2021/0406716 A1* | 12/2021 | Broyles | G06F 40/174 |
| 2022/0035990 A1* | 2/2022 | Kaza | G06F 18/214 |
| 2022/0309089 A1* | 9/2022 | Sutherland | G06F 18/2431 |

* cited by examiner

FIG. 3B

Outline

- Introduction
- Contact details
- Patient history
  - Do you have a history of...
  - Have you ever had...
  - Do you currently take any...
  - Do you have any allergies?...
  - Have you had surgeries...
- Emergency contacts
- IDV
- Signature
- Confirmation Patient Intake Form Build  Launch  ● Preview  Activate Page 3 of 7

○ Yes
○ No

Do you currently take any medication?
○ Yes
○ No

Do you have any allergies?
○ Yes
○ No

Header        Page break
Description text    Name
Email         Phone number
Long text      Short text
Radio select    Checkbox select
Date         Attachment

← | Patient Intake Form          Build  Launch          ⟲ ⟳        • Preview   Rules   Activate    ✕

Outline
- ☐ Introduction
- ☐ Contact details
- ▪ ☐ Patient history
  - Do you have a history of...
  - Have you ever had...
  - Do you currently take any...
  - Do you have any allergies?
  - ☐ List your allergies
  - Have you had surgeries...
- ▪ ☐ Emergency contacts
- ☐ IDV
- ✎ Signature
- ☐ Confirmation Page 3 of 7  ⟨ ⟩

Do you have any allergies?
○ Yes
○ No

List your allergies:
Description text (optional)
[                    ]

⬤ Required

Have you had surgeries in the past?
○ Yes
○ No

Back                    Next

Properties | Rules

Create rule
Set rules to determine when the question will be deployed.

[ Create Rule ]

310 — Patient Intake Form
315 — Page 3 of 7
305 —
325 — Preview
320 — Activate

405

410

Tally

Page 1
Contact details

First name *

Patty

Last name *

Patient

Email *

Phone number *

Date of birth *
mm/dd/yyyy mm/dd/yyyy

Street Address *

FIG. 4B

Tally

415

Page 2
Patient history

Do you have a history of smoking?
◉ No
○ Yes

Do you take any mediciation?
◉ No
○ Yes

Do you have any allergies?
○ No
◉ Yes

420 → List your allergies:
[                    ]

Have you had surgeries in the past?
○ No

FIG. 4C

Tally

425

Page 3
Surgery history

Surgery type *

Date of surgery *
mm/dd/yyyy mm/dd/yyyy

+ Add Surgery

Next

Back

FIG. 4E

GUIDED FORM GENERATION IN A DOCUMENT MANAGEMENT SYSTEM

BACKGROUND

This disclosure relates generally to document management systems, and, more specifically, to generating and modifying a workflow comprising a series of webpages based on an online document template.

Entities may need to gather information from users who are newly associated with the entity or who wish to connect with the entity, e.g., for the exchange of goods or services. For example, a new patient at a medical practice may need to complete a patient intake form before meeting with a medical professional. A customer seeking a mortgage from a bank or other financial institution will need to provide large amounts of data as part of the mortgage application process. And a prospective employee will need to complete an employment application that provides their potential employer information about the employee's educational history, work experience, relevant skills, and the like. In all of these examples, data from the patient/customer/employee is often input manually, e.g., by clerical personnel. However, manual data entry may be a time-consuming and costly process, particularly where large amounts of data are involved, and may have a high likelihood of error. Moreover, because a single version of the form or application is generally provided to all users, it is often the case that users completing these documents are required to view and answer questions that do not apply to them, creating the potential for user frustration and additional inefficiencies in the data entry process.

SUMMARY

Systems and methods are described herein for generating and modifying a workflow comprising a series of pages, such as webpages or application pages, based on an online document. A document management system receives, from a user, a selection of an online document for use as a workflow template, such as a document created and stored by the document management system or a document provided by the user. For example, in one embodiment, the document is a hard-copy document, such as a form, that the user has scanned and uploaded to the document management system.

Modules of the document management system may use the selected online document to generate a workflow for completion by a second user. To do so, the document management system uses a machine-learned model to classify each field of the online document into one of a set of categories and creates a separate form webpage for each category. The fields on a category webpage correspond to the fields identified in the online document. For example, where the online document is a patient intake form, fields on a "Contact details" webpage may ask a user completing the form to provide their full name, address phone number, email address, and the like. The generated form webpages for each of the identified categories may be combined to generate the workflow.

In one embodiment, the document management system modifies the generated workflow by generating one or more additional questions or form webpages based on a response provided by an entity, such as a user completing the form. To do so, the document management system applies conditional logic based on one or more rules provided by the user creating the workflow or suggested by the document management system. Continuing with the patient intake form example, the user may provide input to create a rule that causes display of an additional "Surgeries" webpage in response to the user who is completing the workflow answering "Yes" to the question "Have you had any surgeries?" but the system does not display the additional webpage if the completing user answers "No." This conditional logic therefore ensures that additional information is gathered from users to whom a question is relevant but that a user for whom the additional question fields do not apply does not need to view those fields.

In response to the user completing the modified generated workflow (e.g., by answering all of the questions on each webpage and, optionally, providing identity verification and signing the completed form), the document management system generates a completed document. The completed document is therefore generated based on the online document as well as the answers provided by the user and includes at least one additional field not included in the online document and corresponding to the one or more additional form webpages.

BRIEF DESCRIPTION OF THE DRAWINGS

FIGS. 3A-3E illustrate example user interfaces for a form creation flow, according to one embodiment.

FIGS. 4A-4E illustrate example user interfaces for a form completion flow, according to one embodiment.

DETAILED DESCRIPTION

Figure 1:
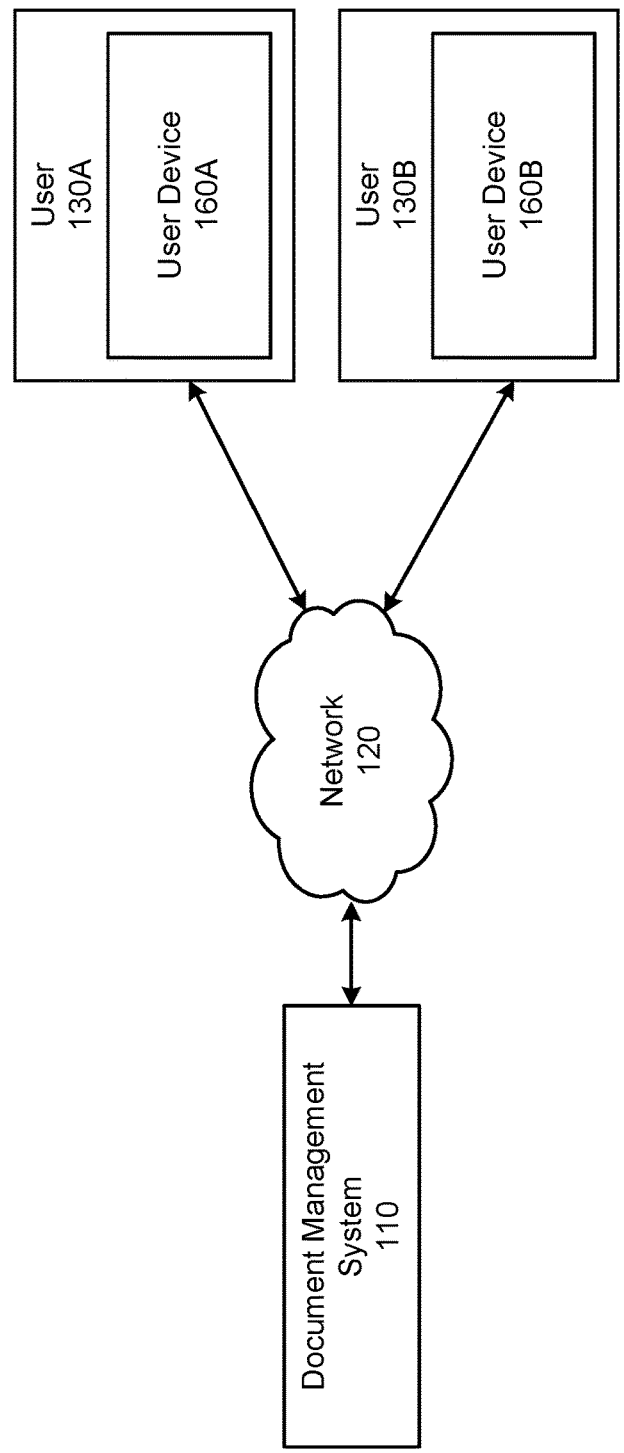
FIG. 1 is a block diagram of a system environment in which a document management system operates, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Moreover, the Figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A" and "130B" in the Figures).

Document Management System Overview

A document management system (DMS) can facilitate the creation, negotiation, and management of documents by one or more users of the DMS. For example, the DMS can allow users to create, edit, review, and negotiate document content with other users of the DMS. In one embodiment, the DMS enables a first user to generate a workflow consisting of a series of webpages configured to ask questions of a second user. The workflow may be generated from an online document comprising a series of fields. The DMS applies a machine-learned model to analyze the content of the online document and classify each field of the document into one of a set of categories. For each category, the DMS generates a form webpage comprising questions corresponding to each field classified as the category and generates the workflow by combining the generated form webpages. Moreover, the DMS may modify the workflow by generating and adding one or more additional questions or form webpages based on answers provided by the second user. For example, if the workflow is associated with a patient intake process, and the second user responds "yes" to a question asking the user if they have any allergies, the workflow may be modified to add one or more additional questions based on the user's response (e.g., questions asking the user to specify their allergies, allergy history, allergy severity, etc.). In response to the second user completing the modified generated workflow, the DMS generates a completed document based on the online document and the answers provided by the second user and can store the completed document, and provide copies of the completed document to the first user, the second user, or an entity associated with the first user.

FIG. 1 is a block diagram of a system environment 100 in which a DMS 110 operates, according to one embodiment. As described above, the DMS 110 enables a sending party to create and send digital documents for electronic completion and/or execution to one or more receiving parties. The receiving parties may review, modify, and execute the documents. The system environment 100 shown by FIG. 1 comprises the DMS 110, a network 120, and a set of users 130 each associated with a user device 160 (including the user 130A and the user 130B associated with the user devices 160A and 160B, respectively). In alternative configurations, different and/or additional components may be included in the system environment 100. In one embodiment, the user 130A is associated with an entity by and for whom a workflow is created, and the user 130B receives and completes the webform associated with the generated workflow. In the primary example discussed throughout this disclosure, the user 130A is an employee of a medical practice, such as a doctor's office, and the user 130B is a new patient of the medical practice. However, this example is used for illustrative purposes only, and one of skill in the art will readily recognize from the following description that the methods disclosed herein may be implemented in a variety of other contexts, such as a customer completing a mortgage application, a prospective employee completing a job application, a user completing a survey, and so on. Moreover, while the primary embodiment discussed herein contemplates display of the workflow on a webpage, one of skill in the art will recognize that each form page could be displayed to a user via alternate display mechanisms, such as an application page (e.g., of a mobile application), a PDF, a series of fields, and the like. Still further, while a machine-learned model is described herein as analyzing and classifying fields of an online document, one of skill will recognize that other categorization methods, such as algorithms that analyze metadata from PDF documents, could be used in other embodiments.

The DMS 110 is a computer system (or group of computer systems) for storing and managing documents for a set of users 130. Using the DMS 110, users 130 can collaborate to create, edit, review, and negotiate documents. For example, the document management system 110 can enable the creation of a form, contract, agreement, press release, technical specification, or other documents. The DMS 110 can be a server, server group or cluster (including remote servers), or another suitable computing device or system of devices. In some implementations, the DMS 110 can communicate with user devices 160 over the network 120 to receive instructions and send documents (or other information) for viewing on user devices 160. The DMS 110 can assign varying permissions to individual users 130 or groups of users 130 controlling which documents a user 130 can interact with and what level of control the user 130 has over the documents they have access to. The DMS 110 will be discussed in further detail with respect to FIG. 2.

The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, 3 G, 4G, code division multiple access (CDMA), digital subscriber line (DSL), and the like. Data exchanged over the network 120 may be represented using any suitable format, such as hypertext markup language (HTML) or extensible markup language (XML). In some embodiments, all or some of the communication links of the network 120 may be encrypted using any suitable technique or techniques.

Through the network 120, the document management system 110 can communicate with user devices 160 associated with users 130. A user 130 can represent an individual, automated system, or group, able to interact with documents (or other content) generated on and/or managed by the document management system 110. Each user 130 can be associated with a username, email address, or other identifier that can be used by the DMS 110 to identify the user 130 and (via permissions) control the ability of the user 130 to view and modify documents managed by the DMS 110. In some implementations, users 130 can interact with the DMS 110 through a user account with the DMS 110 and one or more user devices 160 accessible to that user 130. In some implementations, the set of users 130 can also include AIs, bots, scripts, or other automated processes set up to interact with the DMS 110 in some way. According to some embodiments, users are associated with permissions definitions defining actions users 130 can take within the DMS 110, or on documents, templates, permissions associated with other users and/or workflows.

The user device 160 associated with a user 130 is a computing device capable of receiving user input (for example from a user 130) as well as transmitting and/or receiving data to the DMS 110 via the network 120, according to some embodiments. For example, a user device 160 can be a desktop or a laptop computer, a smartphone, tablet, or another suitable device. User devices 160 are configured to communicate via the network 120 (for example, with the DMS 110). In one embodiment, a user device 160 executes an application allowing a user 130 of the user device 160 to interact with the DMS 110. For example, a user device 160 can execute a browser application to enable interaction between the user device 160 and the DMS 110 via the network 120. A single user 130 can be associated with multiple user devices 160, in some embodiments. Similarly, one user device 160 can be shared between multiple users 130 who may, for example, log into a personal account on the user device 160 to access the document management system 110, according to some embodiments.

Figure 2:
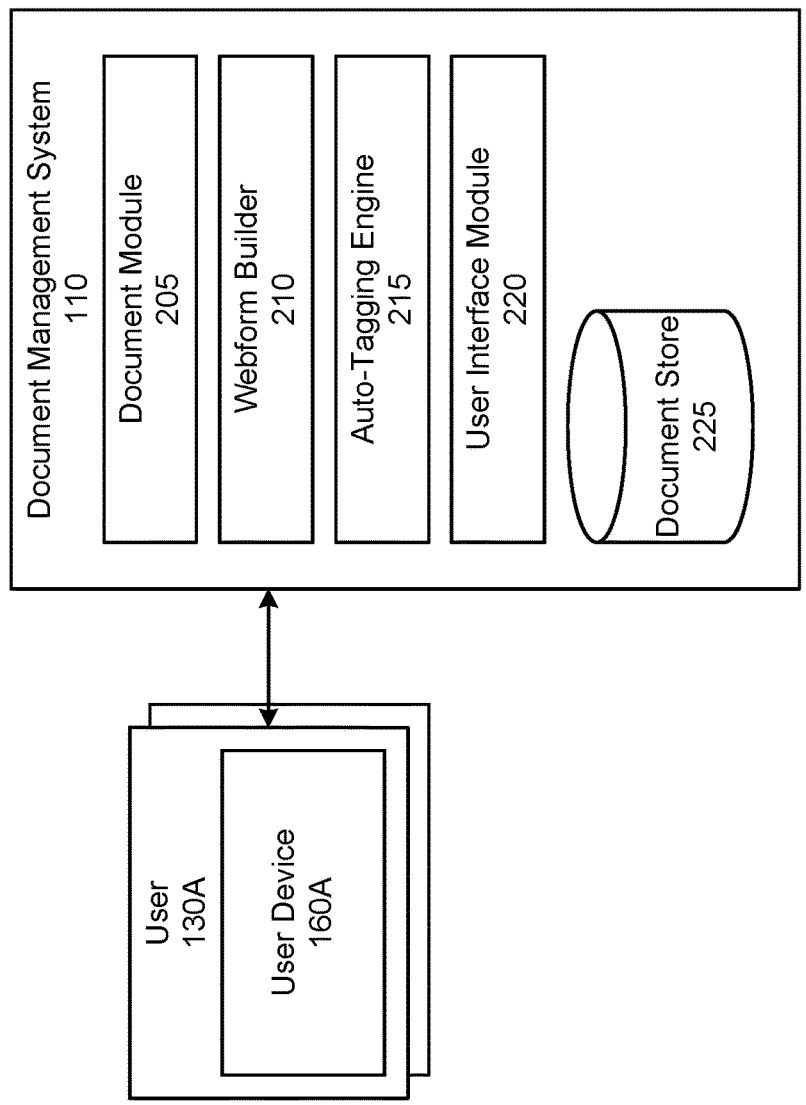
FIG. 2 is a block diagram of a document management system, according to one embodiment.

FIG. 2 is a block diagram of an online document system, according to one embodiment. The environment 200 of FIG. 2 shows a DMS 110 including a document module 205, a webform builder 210, an auto-tagging engine 215, a user interface (UI) module 220, and a document store 225. The environment 200 additionally includes user 130, such as the user 130A, with a corresponding user device 160A communicatively connected to the DMS 110. Conventional components such as network interfaces, security functions, load balancers, failover servers, management and network operations consoles, and the like are not shown in FIG. 2 so as to not obscure the details of the system architecture.

The document module 205 creates, manipulates, and manages documents associated with the DMS 110. For example, the document module 205 can generate new documents, manage and update documents stored by the DMS 110, track potential changes to existing documents, and/or maintain a record of previous versions of documents within the DMS 110.

In some implementations, the document module 205 allows users 130 to upload new documents, make changes to existing documents, and/or view existing documents (including past versions of document and metadata about documents). Each document of the DMS 110 can be associated with document content (the text, images, video content, formatting information, etc. used in a rendered version of the document) as well as document metadata such as a label or identifier, a version history of previous versions of the document, and/or permissions for one or more users 130.

In one embodiment, documents created by the document module 205 or uploaded to the DMS 110 are used as templates to generate webforms for completion by users. For example, where the user 130A is an employee of a medical practice, the user 130A may upload to the DMS 110 a new patient intake form for completion by new patients of the medical practice, such as the user 130B. The uploaded document may be stored in the document store 225 for use by the user 130A as a template for creation of a workflow based on the uploaded document, as described below.

To initiate generation of the workflow, the user 130A provides input to the webform builder 210 to select a document for use as a workflow template. The webform builder 210 may provide for display to the user 130A a list of available documents, including documents created by the document module 205 or uploaded to the DMS 110. Responsive to receiving a selection of an available document from the user 130A, the webform builder 210 retrieves the selected document from the document store 225 and sends the document to the auto-tagging engine 215 for classification.

The auto-tagging engine 215 automatically applies tags and field types to the selected document for auto-tagging using a machine learned model and a language processor. The machine learned model is configured to identify, for each of one or more fields within selected document, a portion of the selected document that corresponds to the field. The machine learned model is trained on a training set of data that includes the training documents having sets of tagged fields. After being trained, the machine learned model is applied to the selected document and outputs information identifying one or more portions of the selected document, each portion corresponding to a field. For example, the machine learned model may output location coordinates of each field within the selected document.

The language processor identifies the text of the selected document associated with the portions of the selected document identified as fields by the machine-learned model. In one embodiment, the language processor performs natural language processing on the identified text of the selected document to identify a field type associated with each field. Automated document tagging using the machine-learned model and language processor are further described in U.S. patent application Ser. No. 16/942,652, filed Jul. 29, 2020, which is hereby incorporated by reference in its entirety.

The auto-tagging engine 215 may further be configured to group the field types into a plurality of categories by identifying headers, section breaks, page breaks, or other contextual information within the selected document. Additionally or alternatively, the auto-tagging engine 215 may use categories from previously tagged documents to identify field category types for the selected document. Categories may include field types that signify to a user completing the document where information should be filled in (e.g., questions requiring a user response, date field, signature field, initial field, etc.) as well as field types intended to convey information to the user but not requiring or providing a space for user response (e.g., an introduction, an overview of the document, a disclaimer, language required by statute or regulation, etc.). For example, category types on a patient intake form might include an introduction, contact information, patient history, emergency contact information, identity verification, and a signature field. In another example, where the selected document is a mortgage application, category types might include personal information, property information, mortgage type, employment information, financial information (including subcategories for income, assets, and liabilities), attachments (e.g., corresponding to fields where a user is prompted to attach documents that corroborate information provided in other fields), and the like.

After identifying and categorizing the fields of the selected document, the auto-tagging engine 215 returns the tagged document to the webform builder 210, which uses the tagged document to generate the workflow. To do so, the webform builder 210 generates a webform page for each category in the selected document identified by the auto-tagging engine 215. For example, a first webform page might include an introduction field that informs a user completing the webform, such as the user 130B, of the purpose of the webform and the identity of the entity associated with the webform and a field prompting the user 130B to begin completing the form. Subsequent webform pages might include one or more question fields corresponding to each identified category and extracted from the selected document; a page prompting a user to submit an image of the user's ID or otherwise provide identity verification; and a signature page. In one embodiment, each webform page corresponds to a category identified from the selected document, however in other embodiments, the webform builder 210 generates one or more additional webform pages for completion by or display to a user 130B completing the webform. For example, the webform builder 210 may generate a confirmation webform page for display to the user 130B after the user 130B has completed all of the fields on the previous pages and provided an electronic signature. In another example, one or more additional questions or webform pages may be generated based on user responses to previous fields, as discussed below. The webform builder 210 combines the webform pages together to generate a workflow corresponding to the original document selected or uploaded by the user 130A.

In one embodiment, the webform builder 210 may modify the workflow by adding additional question(s) or webform pages based on responses provided by the user 130B completing the webform. To do so, the webform builder 210 utilizes logic that enables if-then rules and other logical steps that present additional portions of the form based on responses to previous fields of the webform. The rules may be user-specified or may be automatically implemented or suggested by the webform builder 210, for example based on fields included in previous forms. For example, the webform builder 210 may query a previous patient intake form (e.g., stored in the document store 225) to determine one or more additional questions to include in the workflow generated for the user 130A. Alternatively, the user 130A may provide input to manually add one or more additional question fields or webform pages to the workflow generated by the webform builder 210. For example, where a question field in a "patient history" section asks the user 130B to indicate whether the user 130B is currently taking any medication, the user 130A may create a rule that causes display of one or more additional question fields in response to the user 130B selecting a "yes" answer, but does not display the one or more additional fields if the user 130B answers "no." The webform builder 210 may suggest a follow-up question based on the user response (e.g., "What medication(s) are you currently taking?"; "How long have you been taking this/these medication(s)?"; "How often do you take this/these medication(s)?"), or the user 130A may manually type or paste question text into the additional field(s). In still another implementation, the webform builder 210 may provide suggested question text and enable the user 130A to modify the suggested text.

After finalizing the generated workflow, the user 130A may provide input to the webform builder 210 to save the webform. Generated webforms may be stored in the document store 225, which may comprise a file storage system, database, set of databases, or other data storage system storing documents and metadata about documents managed by the DMS 110. The document store 225 can be a database implemented on a computing system local to the DMS 110, can be a remote or cloud-based database, or can be implemented using any other suitable hardware or software implementation.

The user 130A may also provide input to the webform builder 210 to publish the webform, for example, by providing a uniform resource locator (URL) specifying a location of the webform, such as on a webpage associated with the entity providing the webform for completion (e.g., a registration webpage of the medical office for which the patient intake form was created). The user 130B may initiate the workflow by accessing the webform at the indicated URL, as discussed below.

The UI module 220 generates user interfaces allowing users 130, such as the users 130A and 130B, to interact with documents managed by the DMS 110, according to some embodiments. For example, in one embodiment, the UI module 220 provides a workflow template interface to allow the user 130A to generate and modify a workflow from a selected document, as described above. The webform pages corresponding to the field categories may be displayed on the UI of the user device 160A in an outline format to allow the user 130A to easily navigate through the pages and modify the webform by adding or removing webform pages, reordering the pages, or modifying information within a webform page. A parent element in the outline may correspond to the category name while child elements may correspond to the fields within each category (e.g., the questions from the original document corresponding to each of the identified categories). The workflow template interface may be displayed in a side-by-side format or otherwise in conjunction with the original document to allow the user 130A to view the original document text while creating and/or modifying the workflow or with the webform to allow the user 130A to view changes to the webform in real time as the user 130A provides input to the workflow template interface.

The UI provided by the UI module 220 may include interactive elements that allow the user 130A to control the outline display, such as by expanding the outline to display both parent and child elements or collapse the outline to display only the parent elements. The interactive elements may additionally include elements that allow the user 130A to select one or more fields of a webform page, and generate rules based on user responses provided in other fields. For instance, in the example discussed above in which the user 130A adds one or more fields requesting that a user 130B provide additional information about past surgeries, the UI module 220 may provide interactive fields such as a "+" icon to add a question field, a text box in which the user 130A may type or paste the question text, a slider or other or other element by which the user 130A can indicate whether the additional question is a required field, a selectable icon by which the user 130B can add additional information (e.g., information about additional surgeries, etc.), and the like. Example UIs provided by the UI module 220 to the user 130A will be discussed further below in relation to FIGS. 3A-3E.

The UI module 220 may also provide a form completion UI enabling the user 130B to complete the workflow on the user device 160B. When the user 130B navigates to the URL associated with the generated workflow (e.g., via a link in an SMS message or a QR code), the UI module 220 may provide for display an introductory UI screen, for example, to indicate to the user 130B the purpose of and entity associated with the webform. Responsive to the user 130B selecting a UI element to begin the workflow, the UI module 220 provides for display the webform page associated with the subsequent category in the workflow, such as a page containing fields asking the user 130B to provide biographical and contact information. One or more fields of the webform may be prefilled based on known information about the user 130B (such as information previously provided by the user 130B), and the user 130B may provide information to modify or update prefilled information (e.g., to update the user's name or address).

In one embodiment, the UI module 220 applies rules to ensure that the user 130B is completing the fields of the webform page correctly and completely, such as by allowing only numeric values in a phone number field, requiring that an email address is properly formatted, requiring date input to comply with a specified format (e.g., MM-DD-YYYY or DD-MM-YYYY), indicating on the webform page which fields are mandatory and requiring the user 130B to complete all mandatory fields before navigating to the next page in the form completion UI, and the like. The UI module 220 may also implement an address lookup functionality by providing one or more suggested addresses based on user input and auto-fill one or more additional fields based on user selection of a suggested address.

Modifications made to the generated workflow may be displayed as one or more additional questions in the form completion UI. For example, if a patient history section of the form asks the user 130B whether they have a history of smoking, and the user 130B selects a "Yes" answer, the UI module 220 may display additional questions generated by the webform builder 210 using the conditional workflow logic discussed above. For example, the user 130B may be asked to answer questions designed to elicit more information about the user's smoking history, such as how long the user has smoked, whether the user has received any medical diagnoses related to their history of smoking, etc. This conditional logic therefore ensures that at least a subset of the webform fields are displayed only to users to whom the fields are relevant; users who indicated that they have no history of smoking, for instance, will not be asked to answer additional questions about smoking history.

When the user 130B has completed all of the required fields on each of the webform pages, the UI module 220 may display a review page prompting the user 130B to review answers provided on previous pages and edit answers as needed. In embodiments in which the entity associated with the webform requires identity verification, the UI module 220 may trigger a camera on the user device 160B to allow the user 130B to capture and submit a photo of the user's ID (e.g., driver's license) or otherwise prompt the user 130B to provide identity verification. The UI module 220 may, for example, perform image recognition on a provided ID and compare a name on the ID with the name provided by the user 130B on the webform to verify the user's identity. The UI module 220 may also provide a signature interface to allow the user 130B to provide an electronic signature, for example, using DocuSign, Inc.'s e-Signature product, and may optionally provide payment logic to allow the user 130B to provide payment information, such as credit card or bank account information. The completed webform may be stored in the document store 225 and copies of the completed form transmitted to one or more of the user device 160A, the user device 160B, and an entity associated with the user 130A (such as the medical office for whom the webform was completed). Example UIs provided by the UI module 220 to the user 130B will be discussed further below in relation to FIGS. 4A-4E.

Example Document Editing and Completion Interfaces

As described above, the UI module 220 can present a workflow template UI to allow the user 130A to generate and modify a workflow from a selected document. FIGS. 3A-3E illustrate example user interfaces for performing this workflow generation and modification process, according to one embodiment. Each of FIGS. 3A-3D include a webform editing area 305, an outline area 310, and a toolbar 315 displayed on the workflow template UI.

Figure 3A:
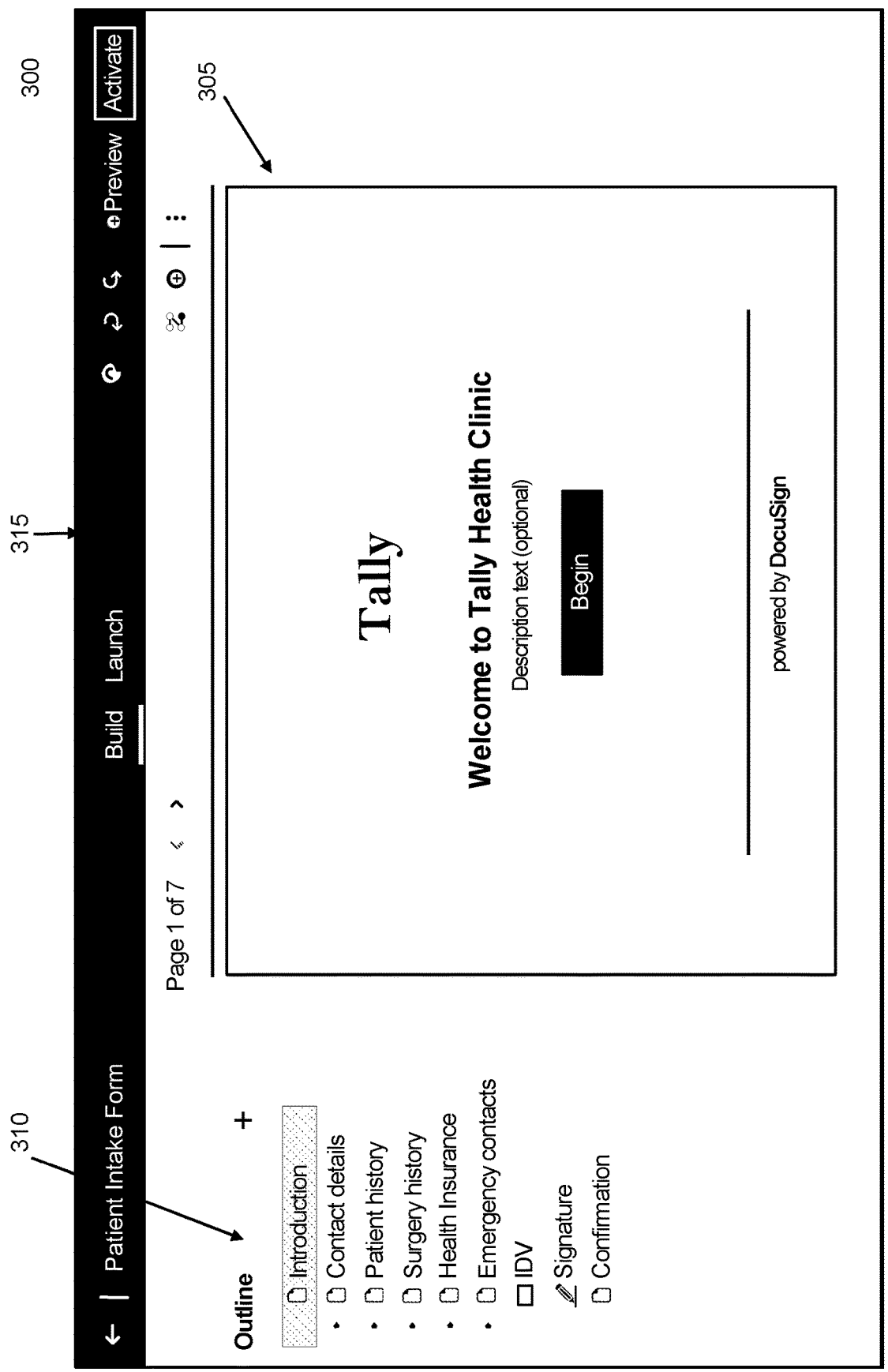
Figure 3B:
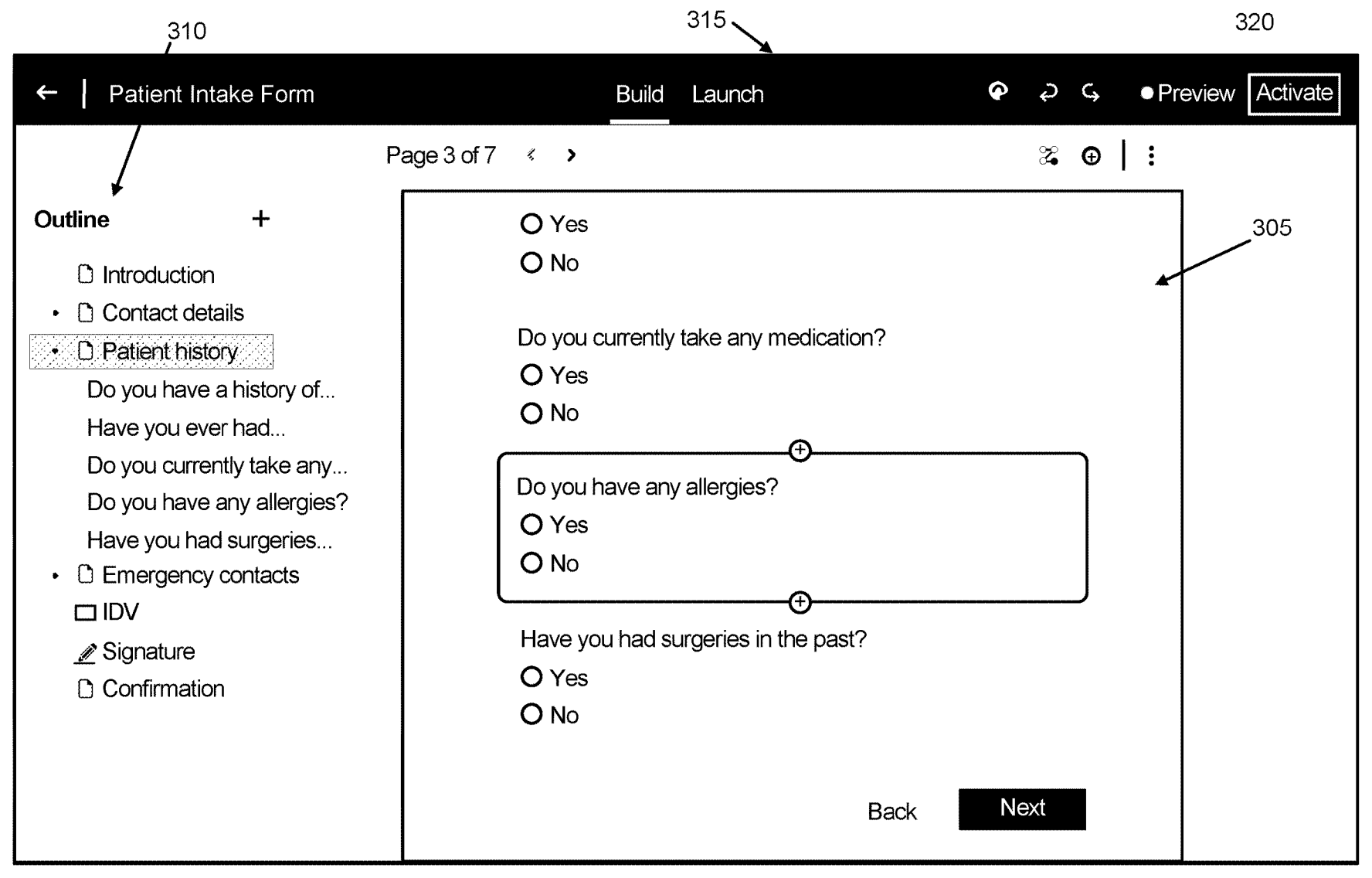
Figure 3E:
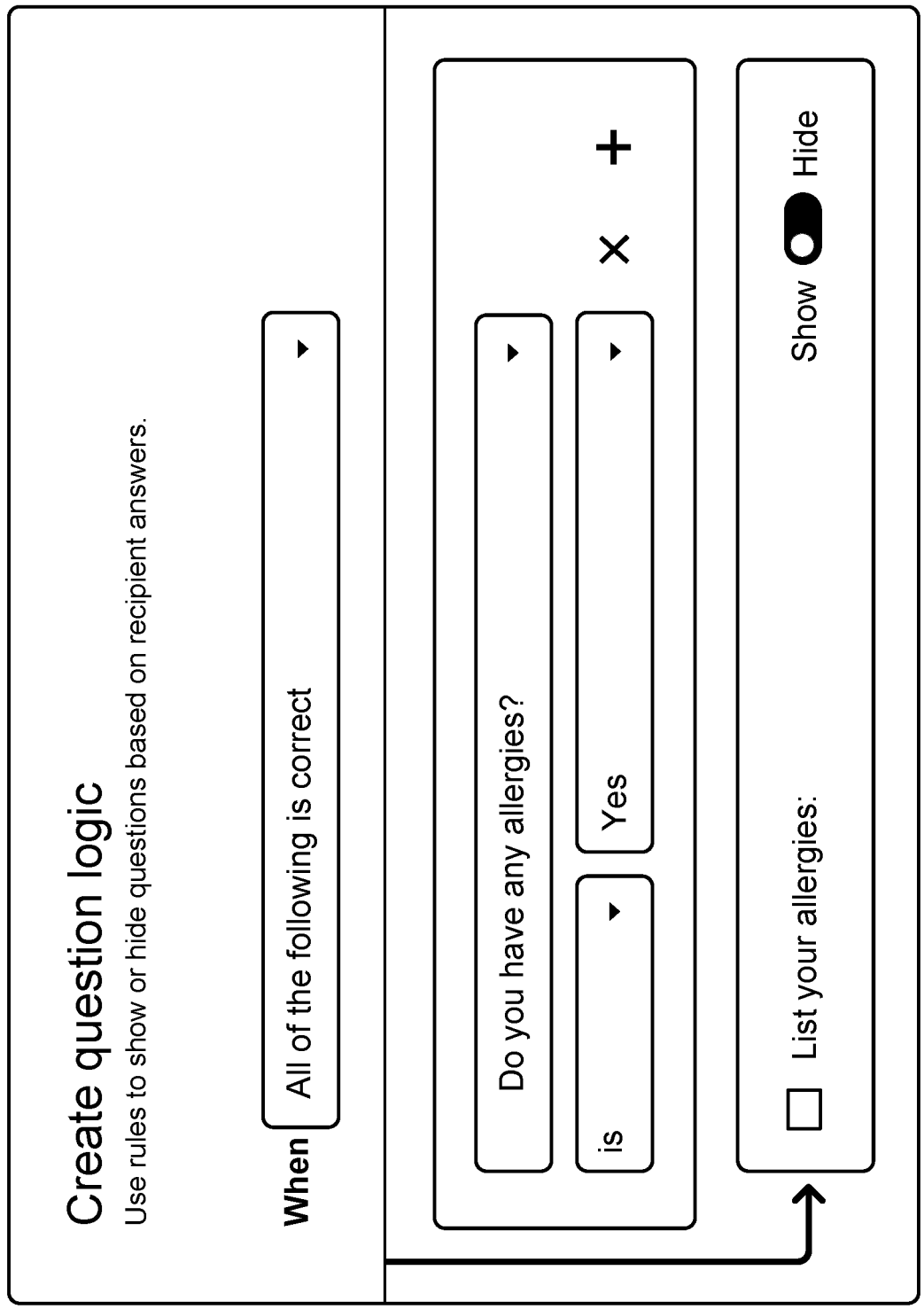

FIG. 3A illustrates an introductory webform page 300 of the workflow template UI. In the displayed embodiment, the user 130A has selected a "Patient Intake Form" template for use in generating the corresponding webform. The underlying document to the template may by a document previously created using the document module 205 or uploaded to the DMS 110 by the user 130A or another user of the DMS 110. The categories identified in the document by the autotagging engine 215 are displayed in the outline area 310, and a webform page corresponding to the selected category, the "Introduction" category in FIG. 3A is displayed in the webform editing area 305. In the displayed embodiment, the Introduction webform page includes interactive interface elements that allow the user to modify the webform page, including, for example, by adding a description of the webform.

As shown in FIG. 3A, the toolbar 315 includes interface elements that allow the user 130A to toggle between a "Build" mode (e.g., to generate and modify the workflow) and a "Launch" mode (e.g., to allow the user 130A to finalize and publish the workflow). The user 130A may also select interface elements to preview the workflow in its current form (e.g., to view the workflow from the perspective of a user 130B completing the webform on a desktop or mobile device 160B and to activate the finalized workflow.

FIG. 3B illustrates a "Patient History" webform page 320 of the workflow template UI. In the displayed embodiment, the "Patient History" parent element in the outline area 310 is expanded to display the child element questions within the displayed category. The user 130A may provide input to the webform builder 210 to edit existing questions, add and remove questions, or apply conditional logic to trigger display of one or more additional questions based on user responses to previous questions. For example, in the displayed embodiment, the user 130A has selected the question "Do you have any allergies?" The webform editing area 305 includes interactive interface elements that allow the user 130A to create one or more rules based on a response from the user 130B to this question. If the user 130A selects one of these interface elements, such as the "+" symbol displayed above and below the question text, the webform builder 210 provides for display and selection one or more options for generating a rule related to the question. For example, as displayed in FIG. 3C, the user 130A may elect to create a new question (e.g., a "Short text" question) and enter the new question text (e.g., "List your allergies") in the new question field, as shown in FIG. 3D. The user 130A may also indicate whether the new question is a required field.

FIG. 3D also includes a rule creation field 325 to allow the user 130A to create a rule associated with the new question. Responsive to the user 130A selecting the "Create Rule" element, the webform builder 210 provides for display a question logic page 330, as displayed in FIG. 3E. In the example shown in FIG. 3E, the user 130A may provide input to create conditional logic related to the selected question by specifying when one or more additional questions are displayed (e.g., If the user 130B answers "Yes" to the question "Do you have any allergies?" display follow-up question "List your allergies"; if the user 130B answers "No," hide the follow-up question). In other implementations, the user 130A may use the conditional logic to generate an additional webform page based on one or more responses from the user 130B. For example, if the user 130B answers "Yes" to the question "Have you had any surgeries?" the user 130A may create an additional surgery webform page asking the user 130B to provide details regarding surgery type, surgery date, surgery location, etc.

FIGS. 4A-4E illustrate an example form completion UI enabling the user 130B to complete the workflow on the user device 160B. In various embodiments, the UI may be displayed on a webpage (e.g., if the user 130B accesses the workflow using a web browser), on an application page (e.g., of a mobile application), as a PDF, as a series of fields, etc.

Figure 4A:
Figure 4D:
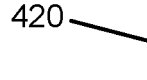

As discussed above, the user may access the workflow by navigating to a URL, e.g., via a link in a SMS message or a QR code. As shown in FIG. 4A, the workflow may begin by displaying an introductory page 400 identifying, for example, the purpose of the workflow and the name of the entity requesting the information from the user 130B. The introductory page 400 corresponds to the introductory webform page 300 shown in FIG. 3A. That is, user input by the user 130A on the introductory webform page 300 (e.g., to add text or edit existing text) determines the content displayed on the introductory page 400 to the user 130B.

The user 130B may select an interface element, such as the "Begin" button in FIG. 4A to initiate the workflow on the user device 160B. As described above, each category of fields identified by the auto-tagging engine 215 may correspond to a webform page of the workflow. For example, FIG. 4B illustrates a UI of a "Contact Details" page 405 whereby the user 130B may enter responses to the displayed fields and edit prefilled text. An indicator bar 410 may be displayed (e.g., at the top of the form completion UI) to visually represent the user's progress through the workflow.

Additionally, as discussed above, responses from the user 130B to a question on a webform page may trigger display of one or more follow-up questions based on conditional logic specified by the user 130A. For example, FIG. 4C illustrates a "Patient History" page 415 that asks the user 130B questions about their medical history. In the displayed example, the user 130B has answered "Yes" to the question "Do you have any allergies?" prompting display of a follow-up field 420 that asks the user to "List your allergies." In another example, a user response may trigger generation and display of an additional webform page. For instance, the user 130B has answered "Yes" to the question "Have you had surgeries in the past" in FIG. 4D, prompting display of a separate "Surgery history" webform page 425 in FIG. 4E. The webform builder 210 may provide the additional page to prompt the user to input additional information relevant to the associated "Yes" response, for instance, by asking the user to list the surgery type and date of surgery and add additional surgery information as needed.

Example Method

Figure 5:
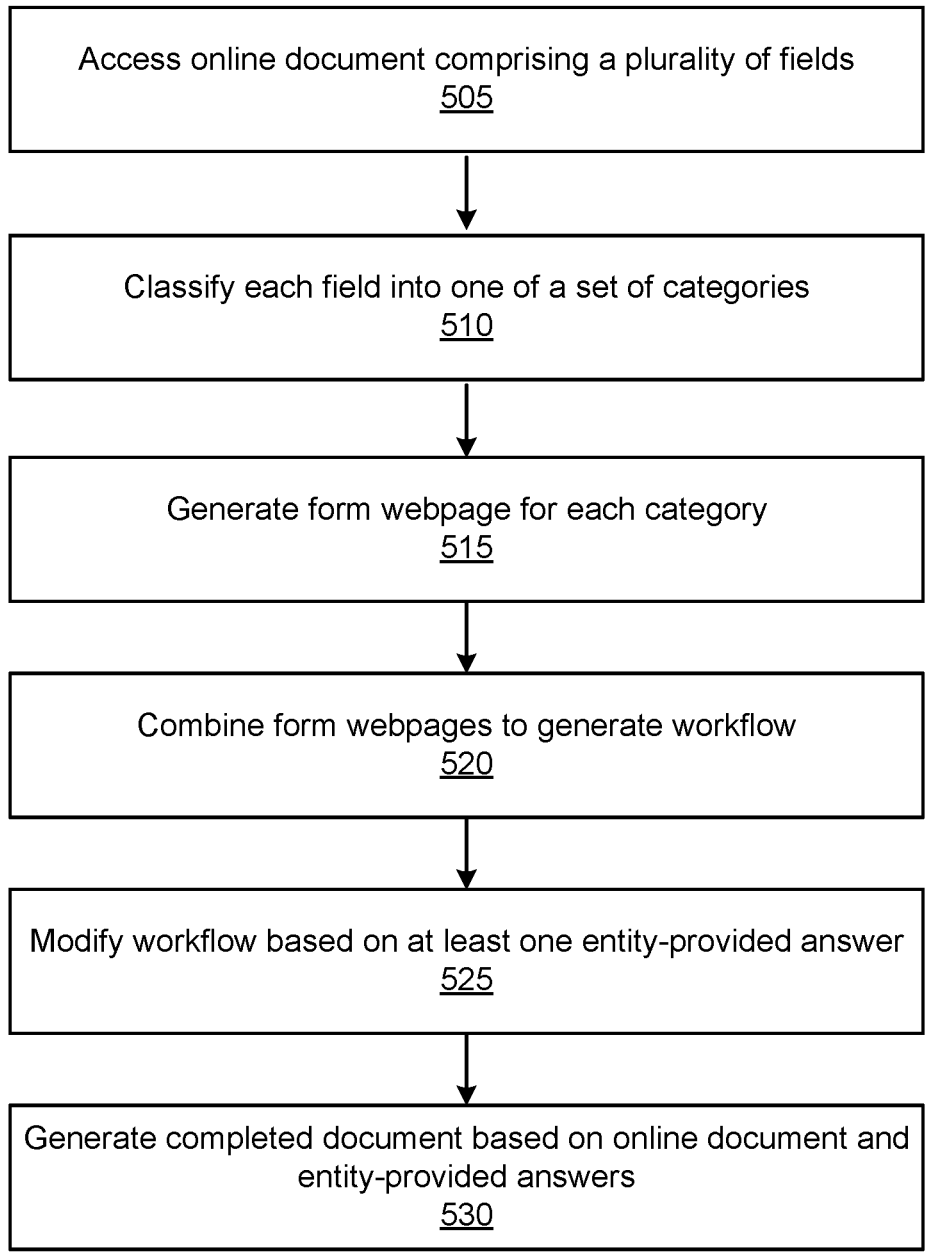
FIG. 5 is a flowchart illustrating a process for performing guided webform generation in a document management system, according to an embodiment.

FIG. 5 is a flowchart illustrating a method 500 for guided webform generation in a document management system, according to one embodiment. The steps of FIG. 5 are illustrated from the perspective of the DMS 110 performing the method 500. However, some or all of the steps may be performed by other entities and/or components. In addition, some embodiments may perform the steps in parallel, perform the steps in different orders, or perform different steps.

The method 500 begins with the webform builder 210 of the DMS 110 accessing 505 an online document comprising a plurality of fields. The online document may be a document that was created by the document module 205 or uploaded by a user, such as the user 130A, to the DMS 110 and stored in the document store 225. In one embodiment, the fields of the online document correspond to questions directed to or requests for information from a second user, such as the 130B. For example, the online document may be a form, application, survey, or the like.

The auto-tagging engine 215 classifies 510 each field of the online document into one of a set of categories. In one embodiment, the auto-tagging engine 215 identifies categories associated with the online document based on headers, section breaks, page breaks, or other contextual information within the online document. Additionally or alternatively, the auto-tagging engine 215 queries previously tagged documents to identify field category types. For example, where the online document is a patient intake form for a medical office, the auto-tagging engine 215 may use category classifications associated with other patient intake forms stored in the document store 225 to identify categories for the selected online document.

For each category, the webform builder 210 generates 515 a form webpage comprising questions corresponding to each field classified as the category and generates 520 a workflow by combining the generated form webpages. For example, where the online document is an employment application, the workflow may include webpages associated with the categories applicant information, education history, employment history, relevant skills, references, and the like. An "applicant information" page may include questions from the online document asking the applicant to provide, for example, their name, address, phone number, email address, etc. In one embodiment, the webform builder 210 generates one or more additional webform pages for completion by or display to a user 130B completing the webform. For example, while the online document serving as a template for the workflow may not include an identity verification field, the webform builder 210 may generate a category, and thus a form webpage, that asks the user 130B to submit a photo of their driver's license or passport or otherwise verify their identity.

Moreover, while the order of the form webpages in the generated workflow corresponds to the order of the categories identified in the online document, the user 130A may provide input to reorder the form webpages, add or remove form webpages, or modify fields within a form webpage. For example, at 525, the webform builder 210 modifies the generated workflow by generating and adding one or more additional questions or form webpages to the workflow based on at least an answer provided by an entity (e.g., the user 130B) completing a generated form webpage associated with the workflow. To do so, the webform builder 210 utilizes logic that enables if-then rules and other logical steps that present additional portions of the form based on responses to previous questions. For example, the user 130A may specify that if a user 130B responds "Yes" to the question "Are you a student?" on an employment application, the UI module 220 should display a subsequent webform page asking the user 130B additional questions relevant to the "Yes" response, such as the school that the user 130B currently attends, the user's anticipated date of completion, what the user is studying, etc. The additional webform page may also ask the user 130B to provide relevant documents, such as a transcript or writing sample. In creating the rule, the user 130A may further specify that if a user 130B answers "No" to the question "Are you a student?" the UI module 220 should not display the additional webform page to the user 130B. This conditional logic therefore ensures that the additional questions or form webpages are displayed only to users to whom the additional fields are relevant.

Finally, in response to the entity (e.g., the user 130B) completing the modified generated workflow, the webform builder 210 generates 530 a completed document based on the online document and the answers provided by the entity. In one embodiment, the completed document includes at least one additional field not included within the online document and corresponding to the one or more additional form webpages.

Computing Hardware

Figure 6:
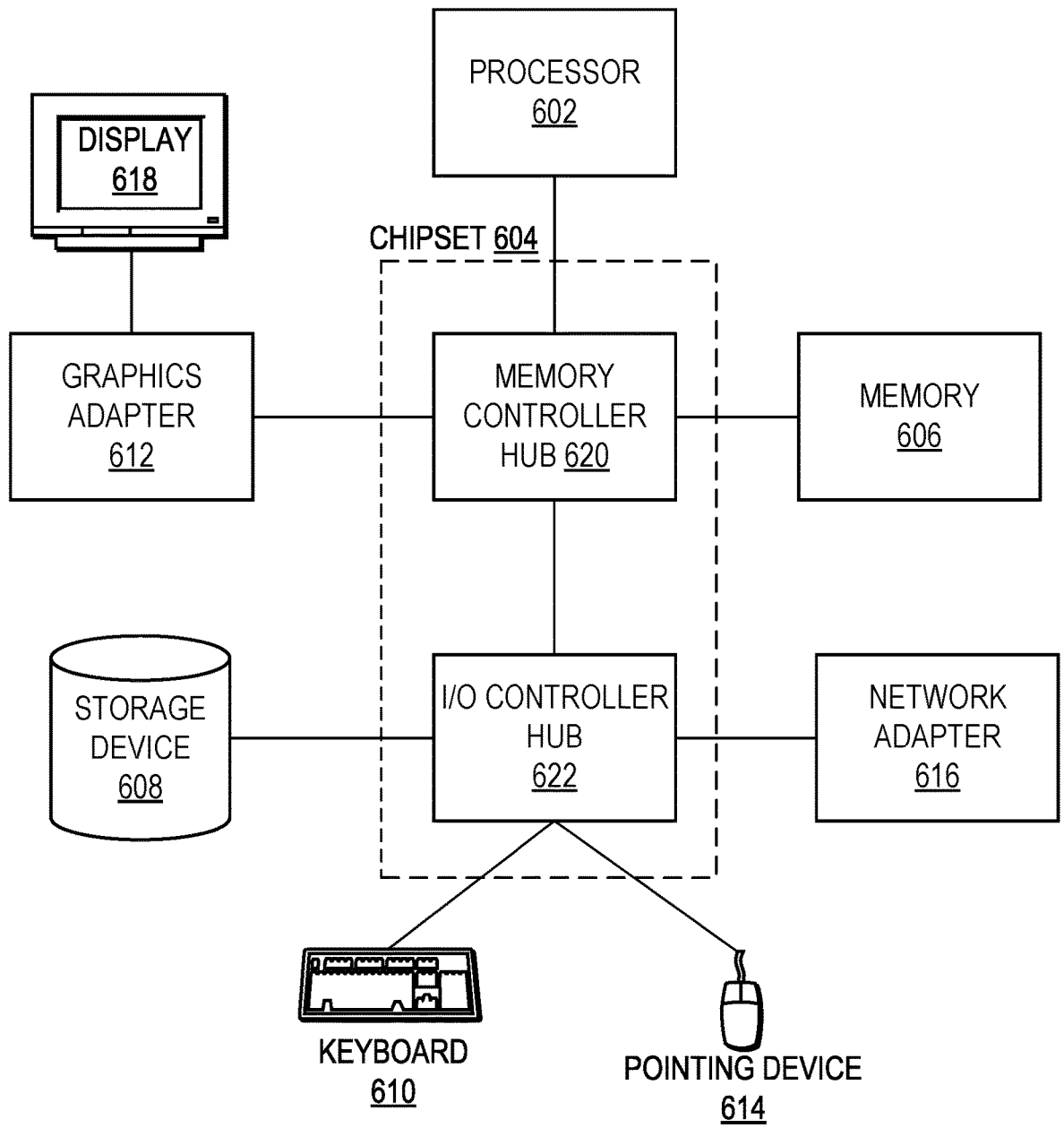
FIG. 6 is a block diagram illustrating components of a computer used as part or all of the document management system or the user device, according to one embodiment

The entities shown in FIG. 1 are implemented using one or more computers. FIG. 6 is an example architecture of a computing device, according to an embodiment. Although FIG. 6 depicts a high-level block diagram illustrating physical components of a computer used as part or all of one or more entities described herein, in accordance with an embodiment, a computer may have additional, fewer, or variations of the components provided in FIG. 6. Although FIG. 6 depicts a computer 600, the figure is intended as functional description of the various features that may be present in computer systems than as a structural schematic of the implementations described herein. In practice, and as recognized by those of ordinary skill in the art, items shown separately could be combined and some items could be separated.

Illustrated in FIG. 6 are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In some embodiments, the computer 600 includes one or more communication buses for interconnecting these components. The one or more communication buses optionally include circuitry (sometimes called a chipset) that interconnects and controls communications between system components.

The storage device 608 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 608 can also be referred to as persistent memory. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

The memory 606 holds instructions and data used by the processor 602. The memory 606 can be non-persistent memory, examples of which include high-speed random-access memory, such as DRAM, SRAM, DDR RAM, ROM, EEPROM, flash memory.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by one or more processors, an online document;
applying, by the one or more processors, a machine-learned model to the online document to identify a plurality of fields of the online document, each field of the plurality of fields configured to receive a corresponding answer, wherein applying the machine-learned model comprises, for each field of the plurality of fields, performing natural language processing on text of the online document to identify a field type of the field and classifying the field into one of a set of categories based on the identified field type;
for each category of the set of categories, generating, by the one or more processors, a form web page comprising one or more questions corresponding to each field of the plurality of fields classified as the category;

generating, by the one or more processors, a workflow, wherein generating the workflow comprises combining the generated form web pages;

modifying, by the one or more processors, the generated workflow to generate a modified generated workflow, wherein the modifying comprises adding one or more additional form web pages to the generated workflow based on an answer provided by an entity completing a generated form web page of the generated form web pages, wherein the answer is responsive to a field of the plurality of fields identified by the machine-learned model, and wherein the one or more additional form web pages comprise an additional field not included in the plurality of fields identified by the machine-learned model; and in response to the entity completing the modified generated workflow, generating, by the one or more processors, a completed document based on the online document and the answer provided by the entity, the completed document including the additional field not included in the plurality of fields identified by the machine-learned model.

2. The method of claim 1, wherein applying the machine-learned model comprises identifying one or more of a header, a section break, a page break, or other contextual information within the online document.

3. The method of claim 1, wherein the one or more additional form webpages are not provided for display to a second entity that provided a second answer, different from the answer, responsive to the field.

4. The method of claim 1, further comprising modifying, by the one or more processors, the generated workflow based on user input comprising one or more of an instruction to add, remove, or reorder one or more fields or webform pages of the generated workflow.

5. The method of claim 1, further comprising:
training the machine-learned model, using a set of training data, to identify, for each field of one or more fields in a document, a portion within the document corresponding to the field,
wherein applying the machine-learned model comprises applying the machine-learned model to the online document to identify portions of the online document that correspond to the plurality of fields of the online document.

6. The method of claim 1, further comprising providing, by the one or more processors, a workflow creation interface on a first user device, the workflow creation interface including an outline area comprising a list of the set of categories and the plurality of fields identified by the machine-learned model in an outline format and a webform editing area displaying fields associated with a selected category.

7. The method of claim 1, further comprising providing, by the one or more processors, a form completion interface on a second user device associated with the entity, the form completion interface comprising a series of form webpages each associated with a category of the modified generated workflow.

8. Non-transitory computer readable storage media comprising instructions that when executed by one or more processors cause the one or more processors to:
access an online document comprising a plurality of fields;

apply a machine-learned model to the online document to identify a plurality of fields of the online document, each field of the plurality of fields configured to receive a corresponding answer, wherein to apply the machine-learned model the instructions cause the one or more processors to, for each field of the plurality of fields, perform natural language processing on text of the online document to identify a field type of the field and classify the field into one of a set of categories based on the identified field type;

for each category of the set of categories, generate a form web page comprising one or more questions corresponding to each field of the plurality of fields classified as the category;

generate a workflow, wherein the instructions to generate the workflow cause the one or more processors to combine the generated form web pages;

modify the generated workflow to generate a modified generated workflow, wherein the instructions to modify cause the one or more processors to add one or more additional form web pages to the generated workflow based on an answer provided by an entity completing a generated form web page of the generated form web pages, wherein the answer is responsive to a field of the plurality of fields identified by the machine-learned model, and wherein the one or more additional form web pages comprise an additional field not included in the plurality of fields identified by the machine-learned model; and in response to the entity completing the modified generated workflow, generate a completed document based on the online document and the answer provided by the entity, the completed document including the additional field not included in the plurality of fields identified by the machine-learned model.

9. The non-transitory computer readable storage media of claim 8, wherein the instructions to apply the machine-learned model cause the one or more processors to identify one or more of a header, a section break, a page break, or other contextual information within the online document.

10. The non-transitory computer readable storage media of claim 8, wherein the one or more additional form webpages are not provided for display to a second entity that provided a second answer, different from the answer, responsive to the field.

11. The non-transitory computer readable storage media of claim 8, wherein the instructions further cause the one or more processors to modify the generated workflow based on user input comprising one or more of an instruction to add, remove, or reorder one or more fields or webform pages of the generated workflow.

12. The non-transitory computer readable storage media of claim 8, wherein the instructions further cause the one or more processors to:
train the machine-learned model, using a set of training data, to identify, for each field of one or more fields in a document, a portion within the document corresponding to the field,
wherein the instructions to apply the machine-learned model cause the one or more processors to apply the machine-learned model to the online document to identify portions of the online document that correspond to the plurality of fields of the online document.

13. The non-transitory computer readable storage media of claim 8, wherein the instructions further cause the one or more processors to provide a workflow creation interface on a first user device, the workflow creation interface including an outline area comprising a list of the set of categories and the plurality of fields identified by the machine-learned model in an outline format and a webform editing area displaying fields associated with a selected category.

14. The non-transitory computer readable storage media of claim 8, wherein the instructions further cause the one or more processors to provide a form completion interface on a second user device associated with the entity, the form completion interface comprising a series of form webpages each associated with a category of the modified generated workflow.

15. A system comprising:
one or more processors; and
non-transitory computer readable storage media comprising instructions that when executed by one or more processors cause the one or more processors to:
access an online document comprising a plurality of fields;
apply a machine-learned model to the online document to identify a plurality of fields of the online document, each field of the plurality of fields configured to receive a corresponding answer, wherein to apply the machine-learned model the instructions cause the one or more processors to, for each field of the plurality of fields, perform natural language processing on text of the online document to identify a field type of the field and classify the field into one of a set of categories based on the identified field type;
for each category of the set of categories, generate a form web page comprising one or more questions corresponding to each field of the plurality of fields classified as the category;
generate a workflow, wherein the instructions to generate the workflow cause the one or more processors to combine the generated form web pages;
modify the generated workflow to generate a modified generated workflow, wherein the instructions to modify cause the one or more processors to add one or more additional form web pages to the generated workflow based on an answer provided by an entity completing a generated form web page of the generated form web pages, wherein the answer is responsive to a field of the plurality of fields identified by the machine-learned model, and wherein the one or more additional form web pages comprise an additional field not included in the plurality of fields identified by the machine-learned model; and
in response to the entity completing the modified generated workflow, generate a completed document based on the online document and the answer provided by the entity, the completed document including the additional field not included in the plurality of fields identified by the machine-learned model.

16. The system of claim 15, wherein the instructions to apply the machine-learned model cause the one or more processors to identify one or more of a header, a section break, a page break, or other contextual information within the online document.

17. The system of claim 15, wherein the one or more additional form webpages are not provided for display to a second entity that provided a second answer, different from the answer, responsive to the field.

18. The system of claim 15, wherein instructions further cause the one or more processors to modify the generated workflow based on user input comprising one or more of an instruction to add, remove, or reorder one or more fields or webform pages of the generated workflow.

19. The system of claim 15, wherein the instructions further cause the one or more processors to provide a workflow creation interface on a first user device, the workflow creation interface including an outline area comprising a list of the set of categories and the plurality of fields identified by the machine-learned model in an outline format and a webform editing area displaying fields associated with a selected category.

20. The system of claim 15, wherein the instructions further cause the one or more processors to provide a form completion interface on a second user device associated with the entity, the form completion interface comprising a series of form webpages each associated with a category of the modified generated workflow.

* * * * *